United States Patent [19]

Nakamura et al.

[11] Patent Number: 4,779,622

[45] Date of Patent: Oct. 25, 1988

[54] ULTRASONIC WAVE DIAGNOSTIC APPARATUS EMPLOYING INTERPOLATED VALUES OF WEIGHTING DATA

[75] Inventors: Yasuhiro Nakamura, Tokyo; Ikuo Sakai, Kawasaki; Masami Kawabuchi, Yokohama, all of Japan

[73] Assignee: Matsushita Electric Industrial Co., Ltd., Osaka, Japan

[21] Appl. No.: 70,255

[22] Filed: Jul. 6, 1987

[30] Foreign Application Priority Data

Jul. 7, 1986 [JP] Japan ................................ 61-159049

[51] Int. Cl.[4] ................................................ A61B 10/00

[52] U.S. Cl. .................................. 128/660.01; 73/626

[58] Field of Search ........................ 128/660, 661, 663; 73/625, 626

[56] References Cited

U.S. PATENT DOCUMENTS

| | | | |
|---|---|---|---|
| 4,016,862 | 4/1977 | Lancee et al. | 128/660 |
| 4,031,743 | 6/1977 | Kossoff et al. | 73/69 |
| 4,127,034 | 11/1978 | Lederman et al. | 73/626 |
| 4,334,432 | 6/1982 | Gill | 73/625 |
| 4,550,606 | 11/1985 | Drost | 128/660 |

*Primary Examiner*—Francis J. Jaworski

*Assistant Examiner*—George Manuel

*Attorney, Agent, or Firm*—Lowe, Price, LeBlanc, Becker & Shur

[57] ABSTRACT

An ultrasonic wave diagnostic apparatus having an array of electro-acoustic transducer elements and respective channels for supplying drive signals to the electro-acoustic transducer elements and amplifying received echo signals from these elements, with the respective overall gains of the channels being controlled by corresponding values of weighting data. A set of mutually independent D/A converters, smaller in number than the number of electro-acoustic transducer elements, produce weighting data for respective ones of the channels that are spaced apart by a fixed number of channels. Respective interpolated values of weighting data for the remaining channels are derived by analog operations executed upon each of successive pairs of D/A converter outputs.

14 Claims, 5 Drawing Sheets

ULTRASONIC WAVE DIAGNOSTIC APPARATUS EMPLOYING INTERPOLATED VALUES OF WEIGHTING DATA

BACKGROUND OF THE INVENTION

The present invention relates to an ultrasonic wave diagnostic apparatus for medical diagnostic applications whereby a beam of ultrasonic waves is generated by an array of transducer elements, with beam control being performed using a plurality of values of weighting data, and in particular to an apparatus whereby the number of components required to produce such weighting data is reduced.

When such an ultrasonic wave diagnostic apparatus transmits an ultrasonic wave beam to the interior of a living body, ultrasonic wave echoes which are reflected from the body differ in amplitude in accordance with acoustic impedance presented to the ultrasonic waves as they pass through the body. Data concerning the living body can thereby be derived by scanning the ultrasonic wave beam, and this data can then be used to produce a display image representing a cross-section of the body. Furthermore, by detecting frequency deviations of the ultrasonic wave echoes it is possible to obtain data concerning blood flow. Such a diagnostic apparatus is widely used in the field of medicine. Generally, scanning of the ultrasonic wave beam is executed by using an in-line array of piezoelectric electro-acoustic transducer elements, referred to for brevity hereinafter as piezoelectric elements. Respectively different delay times are applied to pulse-form drive signals which are supplied to the respective piezoelectric elements, for thereby controlling the direction of transmission of the ultrasonic wave beam. In addition, by applying respectively different delay times to the echo signals which are received by the piezoelectric elements and by adding the resultant signals, the directivity of the received signals is controlled. In this way, the direction of the ultrasonic wave beam and the transmit/receive position is altered each time a transmitting/receiving operation is executed. The directivity of an ultrasonic wave beam produced in this way is such that in addition to a main lobe at the beam center, side lobes are produced which exhibit a lower level of gain than the main lobe. Due to mingling of data from these side lobes with the data from the main lobe, deterioration of image quality occurs. As a countermeasure against this, it is possible to lower the channel gain in accordance with distance of a channel (i.e. of a piezoelectric element) from the center of the piezoelectric element array, during at least transmitting or receiving, by deriving respective values of weighting data for the channels and controlling the channel gain in accordance with these data. This enables the side lobe level to be considerably reduced. Such selective modification of channel gain can be performed either by controlling a drive circuit which generates drive signals that are applied to the electro-acoustic transducer elements, such as to selectively reduce the drive signal level, or by controlling the amplification applied to the received ultrasonic wave echoes (e.g. by employing variable gain amplifier circuits for receiving), or by applying such control during both transmitting and receiving. However in the prior art, it has been necessary to apply such control to every channel of the drive circuit or the receiving amplifier circuit, and moreover to provide separate data conversion means (e.g. D/A converters etc.) to produce respective control data for each of the channels, so that a substantial number of additional components are required.

In order to overcome this problem, a method could be envisaged whereby respective sets of mutually adacent electro-acoustic transducer elements are driven in common by respective control signals, i.e. whereby each D/A converter simultaneously supplies identical control data for a specific set of channels. However in practice, as described hereinafter, such a method is not capable of providing a sufficiently high degree of side lobe suppression.

SUMMARY OF THE INVENTION

It is an objective of the present invention to overcome the problems of the prior art described above, by providing an ultrasonic wave diagnostic apparatus in which channel gain is selectively controlled in accordance with channel position with respect to the ultrasonic wave beam center, whereby weighting data required for each of the channels, i.e. for each of the electro-acoustic transducer elements, can be reliably produced by using a smaller number of D/A converters than the total number of channels, to thereby reduce the number of components required overall in such an apparatus, while enabling a sufficient degree of side lobe suppression to be achieved for obtaining a cross-sectional image of satisfactory quality.

In order to achieve the object set out above, an ultrasonic wave diagnostic apparatus according to the present invention comprises an array of electro-acoustic transducer elements driven by electrical signals for transmitting ultrasonic waves to a body which is under examination and for converting ultrasonic wave echoes received from that body into electrical signals, transmitting/receiving circuits for driving respective ones of said electro-acoustic transducer elements in said array by drive signals and for amplifying echo signals which are received by respective ones of said electro-acoustic transducer elements, said transmitting/receiving circuits having a number of channels which is identical to the number of said electro-acoustic transducer elements, and a set of digital-to-analog converters for producing weighting data for controlling the gains of corresponding ones of said channels, and characterized in that the digital-to-analog converters in said set are fewer in number than the number of said channels, with setting of digital data supplied to said digital-to-analog converters being independently performed for the respective digital-to-analog converters of said set, and furthermore characterized in comprising an interpolation circuit for operating upon outputs from at least two digital-to-analog converters of said digital-to-analog converter group to produce interpolated weighting data and for controlling the gain of at least one channel of said transmitting/receiving circuits in accordance with said interpolated weighting data.

With a configuration according to the present invention as described above, the gains of respective channels of the transmitting/receiving circuits are established by operating on voltages which are produced as outputs from a plurality of D/A converters. As a result, the overall number of components required to implement an ultrasonic wave diagnostic apparatus according to the present invention is substantially reduced by comparison with a prior art apparatus having similar objectives, while an accurately weighted ultrasonic wave beam is generated, so that a cross-sectional image is obtained which is free from image distortion.

DETAILED DESCRIPTION OF THE INVENTION

Figure 1:
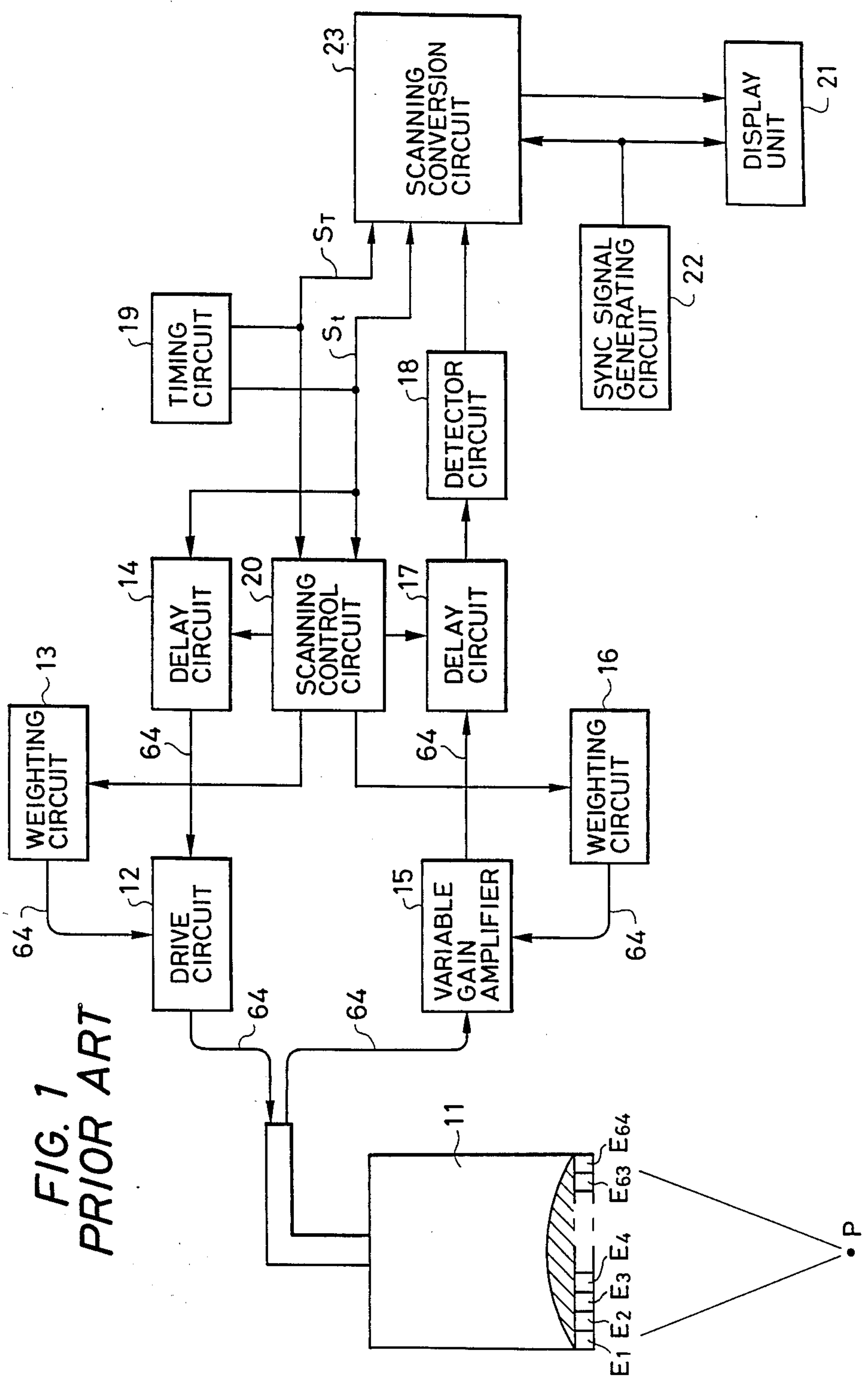
FIG. 1 is a block diagram of a prior art ultrasonic wave diagnostic apparatus.

A method of substantially reducing side lobe levels by reducing channel gain in accordance with the distance of piezoelectric elements (i.e. channels) from the center of the piezoelectric element array, in order to attain improved image quality, is disclosed for example in Japanese Patent Laid-open No. 58-216044. In order to facilitate understanding of the present invention, such a prior art ultrasonic wave diagnostic apparatus is first be described, referring to FIGS. 1 and 2. In FIG. 1 is shown a fan configuration scanning type of ultrasonic wave diagnostic apparatus which employs 64 piezoelectric elements. Probe 11 includes, a cable and 64 independent piezoelectric elements $E_1$ to $E_{64}$, respectively driven by pulse signals applied from a 64 channel drive circuit 12. The channels of drive circuit 12 (i.e. the individual drive circuits of circuit 12 which drive respective piezoelectric elements) are each responsive to a control input (supplied from a weighting circuit as described hereinafter) for determining the amplitude of a drive output produced therefrom. Weighting circuit 13 controls the amplitudes of the respective pulse signals which are generated by the 64 channels of drive circuit 12. Delay circuit 13 generates timing signals to control driving of the piezoelectric elements $E_1$ to $E_{64}$ in accordance with the direction and the focal distance of the ultrasonic wave pulse beam which is generated by probe 11. Variable gain amplifier circuit 15 has 64 channels, for respectively amplifying the echo signals which are received by the piezoelectric elements $E_1$ to $E_{64}$, with the gains of the 64 channels of the variable gain amplifier circuit 15 being respectively controlled by 64 control outputs produced from a weighting circuit 16. Delay circuit 17 applies respectively different delay times to the echo signals which are produced from respective channels of the variable gain amplifier circuit 15, and adds together the resultant delayed signals. Detector circuit 18 detects the echo signals derived from the delay circuit 17. Detector circuit 18 can be of A.M. detector type, for example. Timing circuit 19 produces signals which determine the times at which (1) scanning by the ultrasonic wave beam is started, ultrasonic wave pulses are generated. Scanning control circuit 20 counts the timing signals which are produced by timing circuit 19, for supplying data to the weighting circuits 13 and 16 and delay circuits 14 and 17 in each scanning line. Display unit 21, such as a CRT monitor, displays a cross-sectional image. Unit 21 is controlled by sync signals produced by a sync signal generated circuit 22. Scanning conversion circuit 23 converts the speed at which the echo signals are received into a suitable scanning speed for displaying the cross-sectional image by the display means 21.

Figure 2:
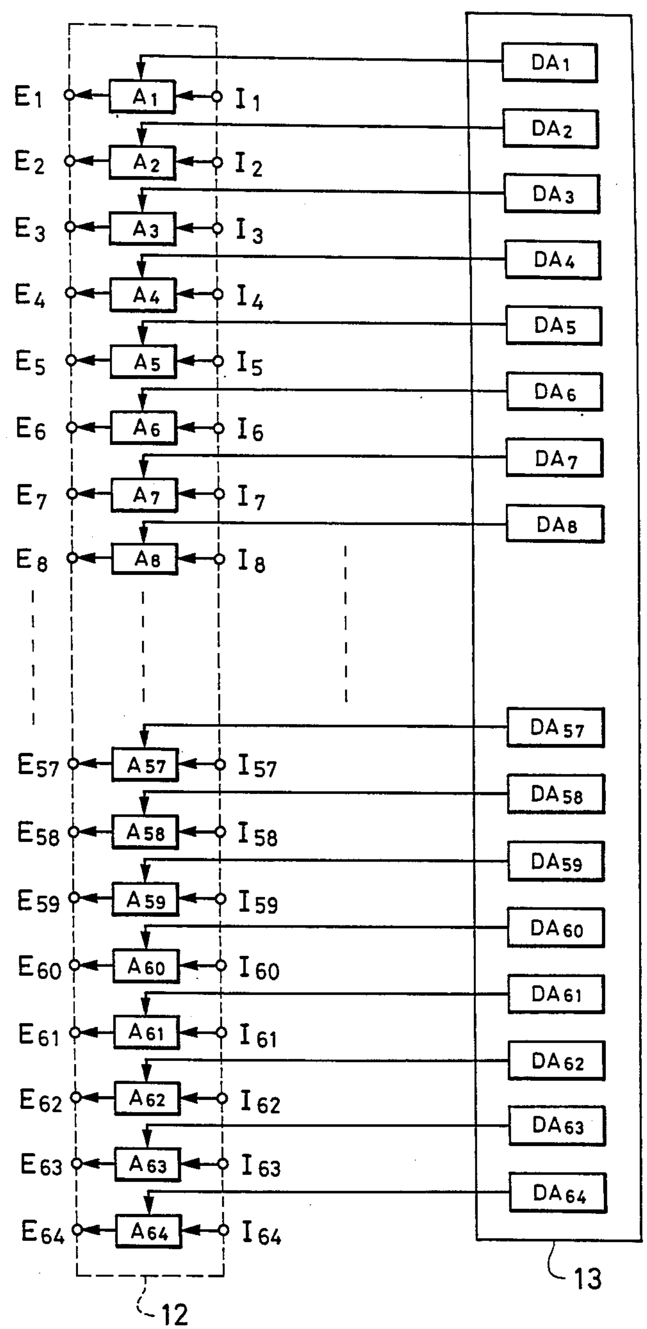
FIG. 2 is a circuit diagram of a drive circuit and a weighting circuit of a prior art ultrasonic wave diagnostic apparatus.

In FIG. 2 details of drive circuit 12 and weighting circuit 13 of FIG. 1 are illustrated as including channels $A_1$ to $A_{64}$ drive signal inputs, $I_1$ to $I_{64}$, drive signal outputs $E_1$ to $E_{64}$, and D/A converters $DA_1$ to $DA_{64}$.

The operation of this prior art example is as follows. Timing circuit 19 produces timing signals $S_t$ at fixed periodic intervals, and generates timing signals $S_T$ once in every specific number of repetitions of the timing signals $S_t$. The timing signals $S_t$ and $S_T$ are respectively applied to a clear terminal and to a clock terminal of a counter which is internally contained in the scanning control circuit 20, whereby scanning line data are produced and appropriate delay data and weighting data for deflection of the ultrasonic wave beam along each of successive scanning lines are obtained from memory means such as a ROM. These data are respectively sent to the delay circuits 14, 17 and to the weighting circuits 13, 16. The delay circuit 14 delay the timing signals $S_t$ by an amount such that the ultrasonic wave pulses transmitted from the piezoelectric elements $E_1$ to $E_{64}$ reach the target point P simultaneously. The 64 delayed trigger signals are applied to inputs of respective ones of the 64 channels of drive circuit 12, and the amplitudes of the respective drive signals which are produced from drive circuit 12 are controlled by the control outputs of the 64 channels of weighting circuit 13. The 64 drive signals which are thereby produced as outputs are applied to drive respective ones of the piezoelectric elements $E_1$ to $E_{64}$ of probe 11, whereby ultrasonic wave pulses are transmitted towards the point P of the body which is under examination. The precise timings of initiation of pulse generation from respective piezoelectric elements are determined by the delayed trigger signals which are supplied from the delay circuit 14 as described above. Reflected echo signals are then received by the piezoelectric elements $E_1$ to $E_{64}$. These 64 echo signals are amplified in respective ones of the 64 channels of the variable gain amplifier circuit 15 by respectively different degrees of gain, as determined by the control outputs produced from the 64 channels of weighting circuit 16 that are applied to the variable gain amplifier circuit 15. Appropriate amounts of delay are applied to the 64 echo signal outputs from variable gain amplifier circuit 15 by the delay circuit 17 such that the echo signals from point P apparently arrive simultaneously, and all of the resultant delayed signals are then added together. The receiving operation described above is executed during a time interval extending from the completion of a transmit operation (based on drive signals from drive circuit 12 and initiated by a pulse of timing signal $S_t$) until the succeeding pulse of timing signal $S_t$ is generated. These alternating transmitting/receiving operations are executed repetitively, with the beam deflection direction being changed at each repetition, whereby a 2-dimensional cross-sectional image is derived.

The scanning speed of the cross-sectional image this obtained is in general different from the scanning speed of the display means (e.g. a CRT raster scan display), and for this reason the cross-sectional image data are transferred through the scanning conversion circuit 23 to the display unit 21. The respective amplitudes of the drive signals which drive the piezoelectric elements $E_1$ to $E_{64}$ and the respective gains which are utilized during amplification of the received echo signals from piezoelectric elements $E_1$ to $E_{64}$ are shown graphically as curve x in FIG. 4(a), in which the physical positions of the piezoelectric elements $E_1$ to $E_{64}$ in probe 11 are indicated along the horizontal axis, and drive signal amplitude (or receiving gain) are plotted along the vertical axis.

The respective channels of drive circuit 12 and of variable gain amplifier circuit 15 are mutually independently controlled by control voltages supplied from external control means. These control voltages, applied from the weighting circuits 13 and 16 to drive circuit 12 and to variable gain amplifier circuit 15 respectively, are of the form indicated by curve x in FIG. 4(a), as determined by 64 D/A converters.

If on the other hand an identical control voltage is applied to each channel of a set of four successively adjacent channels, then only 16 sets of weighting data (i.e. respectively produced from 16 D/A converters) are required. In this way the number of components and the time required for setting of data can be reduced. However if this were done, the weighting data are as shown by curve y in FIG. 4(a).

However with the prior art of ultrasonic wave diagnostic apparatus as described above with reference of FIG. 2, it is necessary to supply weighting data to all of the channels of drive circuit 12 and of variable gain amplifier circuit 15, so that the number of sets of components (e.g. D/A converters, etc) required to control respective channels must be the same as the number of channels. In addition it is necessary to provide a number of sets of weighting data which is identical to the number of channels. Thus, when these data are updated each time that the direction of ultrasonic wave beam scanning is changed, it is necessary to set data for all of the channels. Furthermore there is an increasing trend towards increasing the number of transmitting and receiving channels with such an ultrasonic wave diagnostic apparatus, with a corresponding increase in the number of components required.

As a countermeasure against such an increase in the number of components, it is possible to utilize the same weighting data to control the drive circuit 12 and variable gain amplifier circuit 15 channels of sets of two or more respectively adjacent piezoelectric elements, as described above. However if this is done, discontinuities arise in the weighting which is applied between certain adjacent channels, and it is not possible to attain a sufficiently low side lobe level. This is especially true if the same weighting data are used for a large number of channels, in which case the discontinuities will become excessively large, and the effects of side lobe suppression by application of such weighting is substantially reduced.

A first embodiment of an ultrasonic wave diagnostic apparatus according to the present invention will be described by referring to FIG. 3, which is a circuit diagram of a drive circuit and weighting circuit of this embodiment. As in the case of the prior art example described supra, the transmitting/receiving system for an ultrasonic wave diagnostic apparatus includes 64 electro-acoustic transducer elements. The remaining components of this embodiment can be identical to those of the prior art example shown in FIG. 1 and described above, and further description of these components is omitted.

Figure 3:
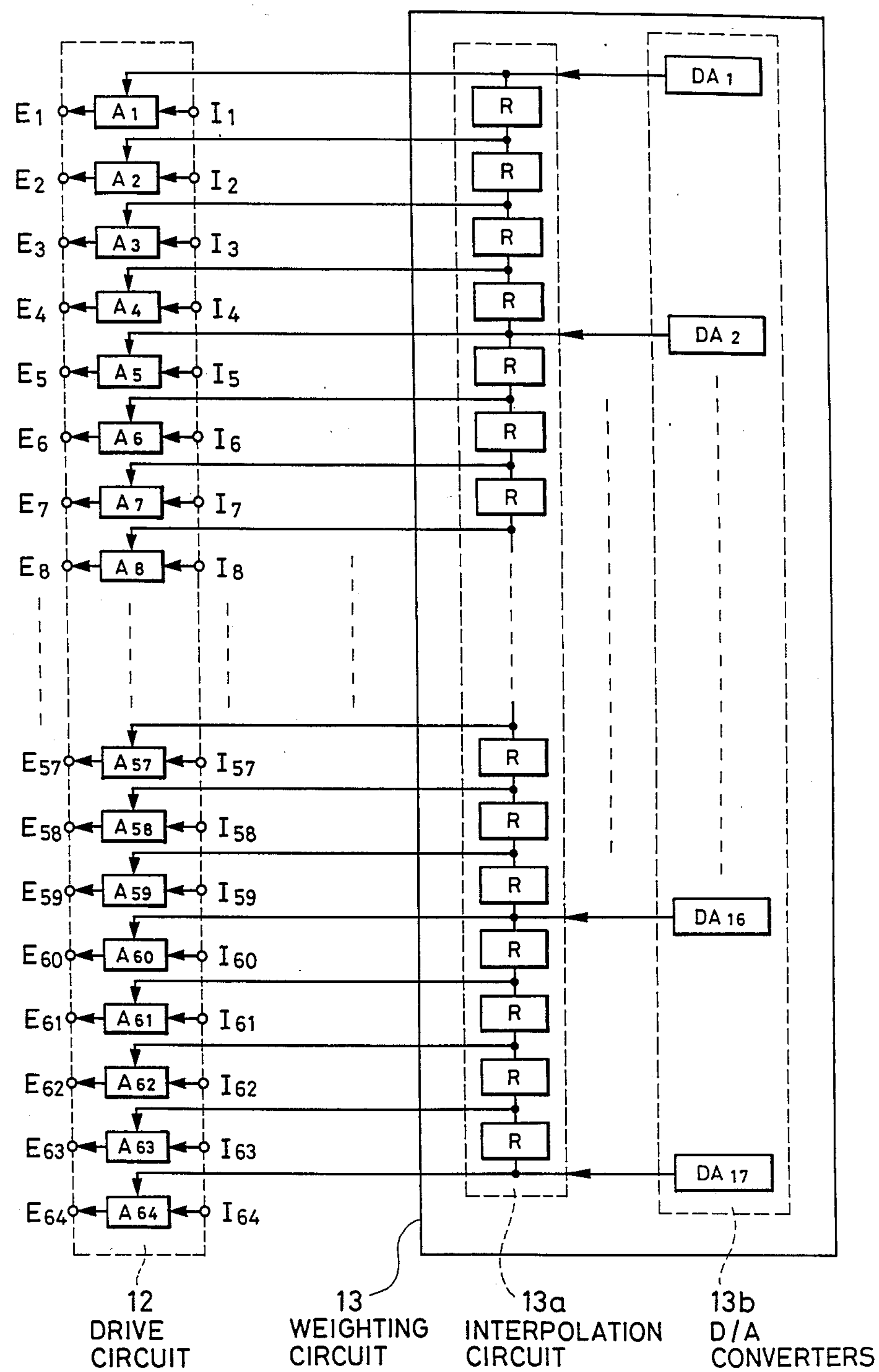
FIG. 3 is a circuit diagram of a drive circuit and a weighting circuit of an ultrasonic wave diagnostic apparatus according to a first embodiment of the present invention.

In FIG. 3, drive circuit 12 includes channels $A_1$ to $A_{64}$, with input drive signals being applied to inputs $I_1$ to $I_{64}$ and outputs being produced from $E_1$ to $E_{64}$. Weighting circuit 13 produces voltages to control the amplitudes of the drive signals which are produced from respective ones of channels $A_1$ to $A_{64}$ of drive circuit 12. The weighting circuit 13 comprises a group of D/A converters $DA_1$ to DA17, collectively designated as 13*b*, which produce output voltages in accordance with digital data are set by an external control circuit, e.g. the scanning control circuit 20 shown in FIG. 1. The output voltages thus produced from D/A converter group 13*b* are applied to an interpolation circuit 13*a*. In this embodiment, the outputs from each pair of mutually adjacent ones of the D/A converters $DA_1$ to DA17 are divided by a set of four resistors, each designated as R, of the interpolation circuit 13*a*.

Figure 4A:
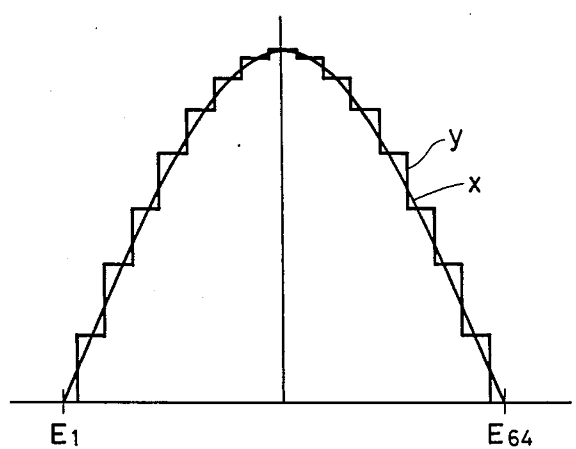
FIGS. 4(a) and 4(b) are graphs illustrating relationships between weighting values applied to transmitting/receiving signals and respective channel positions.
Figure 4B:
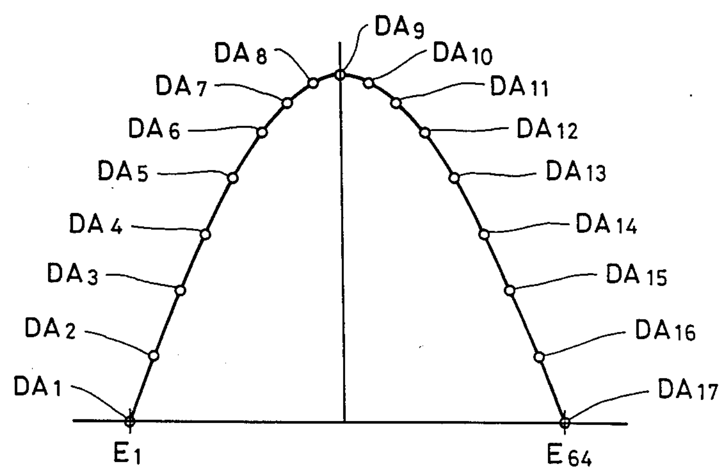

The operation of this embodiment is described by referring to FIGS. 4(a) and 4(b). In FIG. 4(b) as in FIG. 4(a), the physical positions of the piezoelectric elements of probe 1 are indicated along the horizontal axis as $E_1$ to $E_{64}$, while drive voltage amplitude is plotted along the vertical axis. In FIG. 4(a) the curve x indicates an ideal weighting characteristic while FIG. 4(b) shows the weighting characteristic which is obtained by means of the interpolation circuit 13*a* of the present invention. The data which are respectively set for D/A converters $DA_1$ to $D_{17}$ shown in FIG. 3 are determined to produce output voltages which are respectively indicated as $DA_1$ to $DA_{17}$ in FIG. 4(b), with the outputs from mutually adjacent D/A converters of $DA_1$ to $DA_{17}$ being divided between four resistors R. The outputs from the D/A converters $DA_1$ to $DA_{17}$ are directly applied to respective ones of the channels $A_1$, $A_5$, $A_9$, $A_{13}$, $A_{17}$, . . . , $A_{64}$, i.e. to respective channels disposed at 4-channel intervals. The remaining channels are supplied with voltages which are derived from the resistance divider connection points. In this way the drive signals which are applied to the inputs $I_1$ to $I_{64}$ result in respective outputs $E_1$ to $E_{64}$ having amplitudes controlled in accordance with weighting data that are substantially closed to the ideal weighting curve x shown in FIG. 4(a), due to the linear interpolation which is executed by the sets of resistors R. It is thus understood that with this first embodiment of the present invention, a form of analog computation operation utilizing a resistive voltage divider is executed on the output voltages from each pair of mutually adjacent D/A converter outputs, (these D/A converter outputs being spaced apart by a fixed number of channels, i.e. four channels in this embodiment), to thereby produce three interpolated weighting control voltages from each such pair of D/A converter outputs. In this way, the number of components (in particular, D/A converters) which are required for producing weighting data to drive the piezoelectric elements with respectively appropriate drive levels is greatly reduced, in comparison with the prior art.

Figure 5:
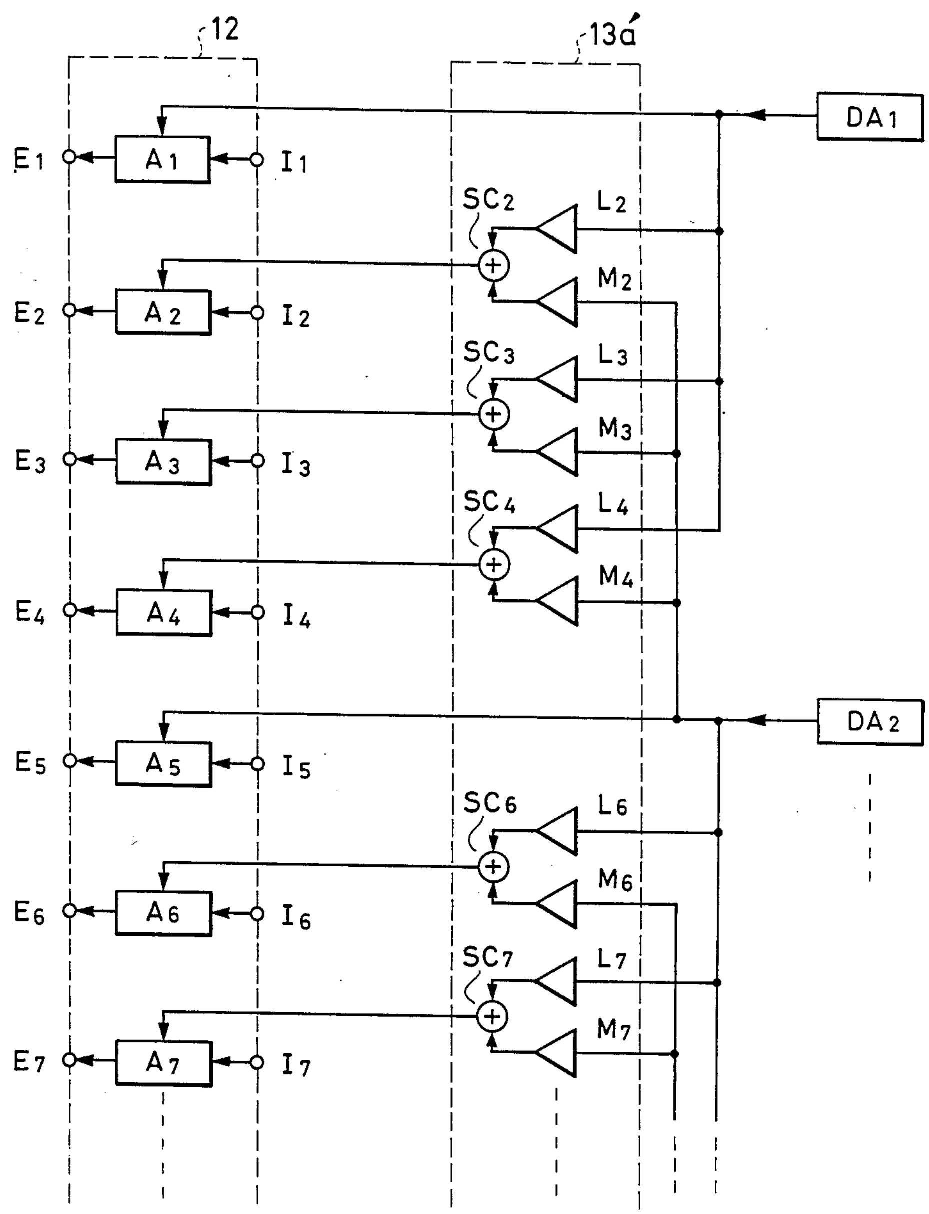
FIG. 5 is a circuit diagram of a drive circuit and a weighting circuit of an ultrasonic wave diagnostic apparatus according to a second embodiment of the present invention.

With the first embodiment of the present invention described above, substantially precise correspondence between the weighting curve obtained using interpolated values of weighting control voltage and the ideal weighting curve can be obtained for only one specific weighting curve, since linear interpolation by means of fixed resistors is employed. FIG. 5 is a circuit diagram of a drive circuit and a weighting circuit for a second embodiment of an ultrasonic wave diagnostic apparatus according to the present invention, whereby interpolated weighting values are obtained in such a way that substantially precise correspondence with various different ideal weighting curves can be obtained. As in the first embodiment described above, a set of three weighting control voltages in produced by interpolation, by operating a pair of weighting control voltages produced from a pair of mutually adjacent D/A converters that are spaced apart by four channels, i.e. the D/A converters $DA_1$ and $DA_2$ shown in FIG. 5 which produce weighting control voltages for the first and the fifth channels, the D/A converters of the fifth and ninth channels, and so on. In this way a total of only 17 D/A converters, designated as $DA_1$ to $DA_{17}$, are required for the 64 channels $A_1$ to $A_{64}$ of drive circuit 12, as for the first embodiment. The manner in which each interpolated weighting voltage is produced by the interpolation circuit 13*a*' of this embodiment is described for the case of the second channel. Here, the weighting voltage outputs from D/A converters $DA_1$ and DA2 are combined in a circuit including a pair of analog multiplier elements (indicated as triangles) which multiply these weighting voltages by coefficients that are designated as $L_2$ and $M_2$ respectively, with the resultant voltages being summed in an analog summing element $SC_1$. The respective magnitudes and polarities of the coefficients $L_2$ and $M_2$ are selected such as to produce an appropriate value of weighting voltage output from the summing element $SC_1$, which is applied to channel $A_2$ of drive circuit 12. Respective weighting voltages are produced for channels $A_3$, $A_4$, $A_6$, $A_7$, . . . in a similar manner, from summing elements $SC_3$, $SC_4$, $S_6$, etc.

It can thus be understood that the second embodiment of the present invention essentially differs from the first embodiment in that the values of the interpolated weighting voltages produced by the interpolation circuit 13*a* ' are mutually independently determined by suitably selecting the values and polarities of the multiplying coefficients ($L_2$, $M_2$, $L_3$, $M_3$, etc.) in accordance with a desired weighting curve, rather than being fixedly determined by linear interpolation as in the case of the first embodiment. The second embodiment therefore enables derivation of a set of interpolated weighting voltages having values closely conforming to a desired arbitrary weighting curve.

In the embodiments of the present invention described above, the invention has only been described as being applied to the drive circuit 12. However it is also possible, to apply an interpolation circuit according to the invention for producing weighting data to be applied to the variable gain amplifier circuit 15. Alternatively, mutually independent interpolation circuits according to the present invention can be applied both to the drive circuit 12, to act on the drive signals, and also to the variable gain amplifier circuit 15, to act on the received echo signals.

With the present invention, as described in the above, analog operations are performed on the analog weighting data produced as outputs from at least two D/A converters of a group of D/A converters. The number of D/A converters is smaller than the number of electro-acoustic transducer elements of an ultrasonic wave diagnostic apparatus. Thereby interpolated weighting data are derived to control the gain of respective channels of transmitting/receiving circuits, other than those channels controlled by weighting data produced from respective ones of the D/A converters. In this way, the number of components required is substantially reduced while enabling accurate weighting to be performed for producng an ultrasonic wave beam whereby a cross-sectional image having a low degree of image distortion can be obtained.

What is claimed is:

1. An ultrasonic wave diagnostic apparatus comprising:

an array of several electro-acoustic transducer elements responsive to electrical signals for transmitting ultrasonic waves to a body under examination and for converting into electrical signals ultrasonic wave echoes reflected from said body;

several transmitting/receiving circuits for driving respective ones of said electro-acoustic transducer elements in said array with drive signals and for amplifying echo signals which are received by respective ones of said electro-acoustic transducer elements, said transmitting/receiving circuits including several channels equal in number to the number of said several electro-acoustic transducer elements;

plural digital-to-analog converters for producing weighting data for controlling the gains of corresponding ones of said channels, the number of said plural digital-to-analog converters being fewer in number than the number of said several channels; and interpolation circuit means responsive to said weighting data produced from at least two of said digital-to-analog converters for deriving interpolated weighting data, said interpolated weighting data being applied to control the gain of at least one channel of said transmitting/receiving circuits.

2. The apparatus of claim 1, wherein interpolation circuit means comprises a resistive voltage divider coupled between output signals derived from a pair of said digital-to-analog converters, said interpolated weighting data being generated in the form of at least one output voltage appearing at a tap of the voltage divider between said output signals derived from the pair of converters.

3. The apparatus of claim 1, wherein said interpolation circuit means comprises operating means for selectively amplifying or attenuating respective weighting signals derived from said pair of digital-to-analog converters to derive corresponding output voltages and for determining respective polarities of said output voltages, and analog summing means for summing said output voltages to produce an interpolated weighting voltage as said interpolated weighting data.

4. The apparatus of claim 3 wherein said operating means multiplies the amplitude of each of said weighting signals derived from said digital-to-analog converters by respective coefficients of arbitrarily selectable magnitude, to produce said corresponding output voltages.

5. The apparatus of claim 1 wherein said interpolation circuit means comprises a first interpolation circuit for applying weighting data to said drive signals and a second interpolation circuit means for applying weighting data to said echo signals, said first and second interpolation circuits functioning mutually independently.

6. The apparatus of claim 1 wherein said weighting data derived from said interpolation circuit means are applied to said transmitting/receiving circuit means for controlling amplification levels of either said drive signals or said echo signals.

7. An ultrasonic wave diagnostic apparatus comprising an array of M electro-acoustic transducer elements for transducing electric and ultrasonic waves between a body under examination and electric circuit means, where M is an integer greater than 2, M valuable gain channels, one for each of said elements, channel k being connected in excitation relation with element k, where k is selectively each of the integers from 1 to M, and means for controlling the gain of said variable gain channels, said gain controlling means including means for supplying a gain control signal to channel k, said gain controlling means including N variable amplitude analog sources for deriving N variable amplitude voltages, where N is an integer greater than 1 and less than M, and means for interpolating between the values of signals derived from pairs of said analog sources for deriving further variable amplitude voltages, the variable amplitude and further variable amplitude voltages controlling the gains of the M channels.

8. The apparatus of claim 7 wherein elements p . . . r are spatially arranged in order, where p . . . r are elements within the M elements, and the means for supplying the gain control signal to channel q (where q is selectively each of p . . . r) is responsive to the signals derived from a pair of said analog sources and includes means for linearly combining the signals from said pair of analog sources with proportionality factors representing the excitation magnitude of element q relative to the values of the variable amplitude voltages derived from said pair of analog sources, the values of the variable amplitude and further variable amplitude voltages being such that the gain control signals for channels p . . . r change progressively.

9. The apparatus of claim 8 wherein the means for interpolating includes a resistive voltage divider connected between the pair of sources, the voltage divider including a tap at which the gain control signal for each of channels p . . . r is derived.

10. The apparatus of claim 8 wherein elements o and s are spatially arranged in order with elements p . . . r so element o is immediately adjacent element p and element s is immediately adjacent element r, elements o and s not being included in elements p . . . r, the variable voltages of the pairs of analog sources being respectively applied to channels o and s without passing through the interpolating means.

11. The apparatus of claim 7 wherein elements p . . . r are spatially arranged in order, where p . . . r are elements within the M elements, and the means for supplying the gain control signal to channel q (where q is selectively each of p . . . r) is responsive to the signals derived from a pair of said analog sources and includes means for linearly combining the signals from said pair of analog sources with proportionality factors representing the excitation magnitude of element q relative to the values of the variable amplitude voltages derived from said pair of analog sources, the means for interpolating including an analog summing network for each of channels p . . . r, the analog summing network for channel q linearly combining the variable voltages of said pair of sources with weighting factors independent of weighting factors of the other ones of channels p . . . r.

12. The apparatus of claim 11, wherein the analog summing network for channel q includes an operational amplifier having a gain and polarity determined by a proportionality factor for channel q.

13. The apparatus of claim 11 wherein elements o and s are spatially arranged in order with elements p . . . r so element o is immediately adjacent element p and element s is immediately adjacent element r, elements o and s not being included in elements p . . . r, the variable voltages of the pairs of analog sources being respectively applied to channels o and s without passing through the interpolating means.

14. The apparatus of claim 7 wherein each of said N variable amplitude analog sources includes a digital-to-analog converter for deriving one of said variable amplitude voltages.

* * * * *